United States Patent [19]
Jobling et al.

[11] Patent Number: 5,928,293
[45] Date of Patent: Jul. 27, 1999

[54] METHOD FOR GENERATING A CLOCK SIGNAL FOR USE IN A DATA RECEIVER, CLOCK GENERATOR, DATA RECEIVER AND REMOTE CONTROLLED ACCESS SYSTEM FOR VEHICLES

[75] Inventors: David Trevor Jobling, Geneva; Olivier Pilloud, Touxtens, both of Switzerland; Pascal Leclercq, Fresnes; Laurent Tran, L'Hay-les-Roses, both of France

[73] Assignee: Motorola, Inc., Schaumburg, Ill.

[21] Appl. No.: 08/827,991

[22] Filed: Apr. 29, 1997

[30] Foreign Application Priority Data

Apr. 30, 1996 [FR] France .................................. 96 05430

[51] Int. Cl.⁶ .............................. G06F 17/00; G06F 7/00
[52] U.S. Cl. .............................. 701/2; 375/355; 375/361; 375/365; 370/324
[58] Field of Search .................................. 701/2; 370/324; 375/253, 354, 355, 333, 359, 361, 365

[56] References Cited

U.S. PATENT DOCUMENTS

| | | | |
|---|---|---|---|
| 3,575,554 | 4/1971 | Schmidt | 178/69.5 |
| 4,317,211 | 2/1982 | Quesnell, Jr. | 375/333 |
| 4,807,260 | 2/1989 | Solina | 375/333 |
| 4,862,482 | 8/1989 | Patchen | 375/333 |
| 5,049,867 | 9/1991 | Stouffer | 340/426 |
| 5,103,465 | 4/1992 | Crisler et al. | 375/110 |
| 5,491,713 | 2/1996 | Kwok et al. | 375/333 |

FOREIGN PATENT DOCUMENTS 2725091  9/1994  France .......................... H04L 7/100

OTHER PUBLICATIONS

"Synchronization For Passive Optical Networks", 8217 Journal of Lightwave Technology, May 13, 1995, No. 5, New York, NY.

Primary Examiner—William A Cuchlinski, Jr.
Assistant Examiner—Gertrude Arthur
Attorney, Agent, or Firm—Robert D. Atkins

[57] ABSTRACT

A data receiver is arranged to receive data comprising a sync word having a predetermined data frequency ($f_{rx}$) and predetermined value. A clock signal (SCLK) is generated which is substantially synchronised with the received data. The n clocks (CLK1–CLK8) are generated, each of the n clocks having a frequency (fclk) which is substantially the predetermined data frequency ($f_{rx}$) and is out of phase with an adjacent clock of the n clocks by 1/n of a clock period. The sync word is sampled using each of the n clocks to determine which one of the n clocks is optimally synchronised with the sync word and to provide the determined one of the n clocks at an output (18). The determined one of the n clocks provides the clock signal (SCLK).

15 Claims, 7 Drawing Sheets

METHOD FOR GENERATING A CLOCK SIGNAL FOR USE IN A DATA RECEIVER, CLOCK GENERATOR, DATA RECEIVER AND REMOTE CONTROLLED ACCESS SYSTEM FOR VEHICLES

FIELD OF THE INVENTION

This invention relates to a method for generating a clock signal for use in a data receiver, and a clock generator for generating a clock signal for use in a data receiver, such as a data receiver which is used in a remote controlled access system for vehicles.

BACKGROUND OF THE INVENTION

In data communications systems, a data transmitter transmits data which data can then be received and subsequently decoded by a data receiver. In order to decode the received data, the data receiver has to be synchronised to the received data. In systems where a single communications channel is available for data transmission, this is achieved by generating a clock signal in the data receiver which is synchronised to the received data.

A known technique for generating a clock signal substantially synchronised to received data, see for example the description beginning on page 414 of the book 'Fondements de la théorie de la transmission de l'information' by Alexandru Spataru, utilises the fact that the data receiver has a pre-knowledge of the data rate of the received data. The data receiver detects edges of the received data and once an edge of the received data has been detected, the received data is sampled again after more than half a period of the received signal to determine whether the data is still at the same level. This enables the data receiver to decode the received data.

In general there may be ambiguity about the sense of the received data; this may be resolved by comparing part of the received data with a reference word previously stored in the receiver.

This technique does not require a precise sampling frequency and is therefore very quick to provide a clock signal. However, this known technique relies on the detection of edges in the received data, and thus such a technique has significant disadvantages when applied to systems in which noise can frequently distort the edges and hence corrupt the data. This can lead to errors in the data decoding by the data receiver.

Another known technique for generating a synchronised clock signal uses a Phase Locked Loop (PLL) in the data receiver. The data transmitter transmits a clock signal before transmitting data. The PLL locks the receiver oscillator to the transmitted clock signal so that once the PLL is locked, the PLL output signal is synchronised to the received data. This technique requires that the receiver oscillator has a frequency sufficiently close to the frequency of the transmitted clock signal so that the PLL can achieve lock in a reasonable amount of time. The parameters of the data receiver are set assuming that the PLL is locked after a predetermined time, at which time the data receiver can receive and decode the received data.

Although this technique provides an accurate clock signal for use in the data receiver which is not sensitive to noise, the time required to achieve lock can be too long for some applications, such as battery powered systems. These systems, in order to enhance battery life, require the data transmitter and data receiver to be switched on and off for very short periods of time.

For example, in remote controlled access systems for motor vehicles, the receiver is periodically switched off and on. In order to save vehicle's battery life, the time when the receiver is on is made as short as possible regarding the time needed to decode the locking/unlocking data received from a hand-held transmitter or remote unit carried by the vehicle operator. As soon as a coded signal is received in the period when the receiver is on, the clock signal generated in the clock generator of the receiver must be synchronised to the data received, in order to allow decoding of the data before the receiver is turned off again.

There is therefore a need for an improved clock generator and an improved method for generating a clock signal for use in a data receiver, which clock signal is substantially synchronised to the data received by the data receiver in which the above mentioned problems are mitigated.

SUMMARY OF THE INVENTION

In accordance with a first aspect of the present invention there is provided a method for generating a clock signal for use in a data receiver, the clock signal being substantially synchronised with data received by the data receiver, the received data comprising a sync word having a predetermined data frequency and predetermined value and being Manchester coded so that each bit of the sync word comprises a logic '1' in one phase of a clock period and a logic '0' in an anti-phase of the clock period, the method comprising the steps of:

generating n clocks, each of the n clocks having a frequency which is substantially the predetermined data frequency and being out of phase with an adjacent clock of the n clocks by 1/n of the clock period, each of the n clocks further having one other clock of the n clocks in anti-phase therewith, wherein the data receiver comprises register means comprising n registers, each of the n registers being clocked by a respective one of the n clocks, and having an anti-phase register clocked by an anti-phase clock;

shifting the received data into each register of the n registers in parallel according to the respective clock of the n clocks;

comparing the contents of each register with a Manchester coded comparison word having the predetermined value and providing a comparison signal for each of the n registers, the comparison signal having a first logic state when the contents of the register match the comparison word and a second logic state when the contents of the register do not match the comparison word;

checking whether the contents of each register is inverted compared to the contents of its anti-phase register;

providing an output signal for each register, the output signal having a first logic state when the comparison signal for the register has a first logic state and the contents of the register is inverted compared to the contents of its anti-phase register, and a second logic state when the comparison signal of the register has a second logic state and/or the contents of the register is not inverted compared to the contents of its anti-phase register;

selecting one of the n clocks which clocks a register whose output signal has the first logic state and which is substantially immune to noise; and providing the selected one of the n clocks at an output, the selected one of the n clocks providing the clock signal.

Thus, an advantage of the present invention is that it derives the clock signal which clocks the data receiver from a precise on-chip frequency reference which ensures improved performance in the presence of noise.

A further advantage of the present invention is that it uses only n registers to check the phase of 2n bits of the received data and so provides enhanced immunity to noise by ensuring that data and not noise has caused the recognition of the sync word with the minimum number of registers.

In accordance with a second aspect of the present invention there is provided a clock generator for generating a clock signal for use in a data receiver, the clock signal being substantially synchronised with data received by the data receiver, the received data comprising a sync word having a predetermined data frequency and a predetermined value, the clock generator comprising:

means for generating n clocks, each of the n clocks having a frequency which is substantially the predetermined data frequency and being out of phase with an adjacent clock of the n clocks by 1/n of a clock period;

register means coupled to receive the received data, the register means comprising:

n registers, each of the n registers being clocked by a respective one of the n clocks such that the received data is shifted into each register of the n registers in parallel according to the respective clock of the n clocks, and n decode logic coupled to respective registers of the n registers, each decode logic for comparing the contents of the respective register with a comparison word having the predetermined value and providing an output signal, the output signal having a first logic state when the contents of the respective register match the comparison word and a second logic state when the contents of the respective register do not match the comparison word; and logic means for selecting one of the n clocks which clocks a register whose output signal has the first logic state and which is substantially immune to noise for providing the selected one of the n clocks as the clock signal for use in the data receiver.

BRIEF DESCRIPTION OF THE DRAWINGS

Preferred embodiments of the present invention will now be described, by way of example only, with reference to the accompanying drawings in which.

DETAILED DESCRIPTION OF THE DRAWINGS

Figure 1:
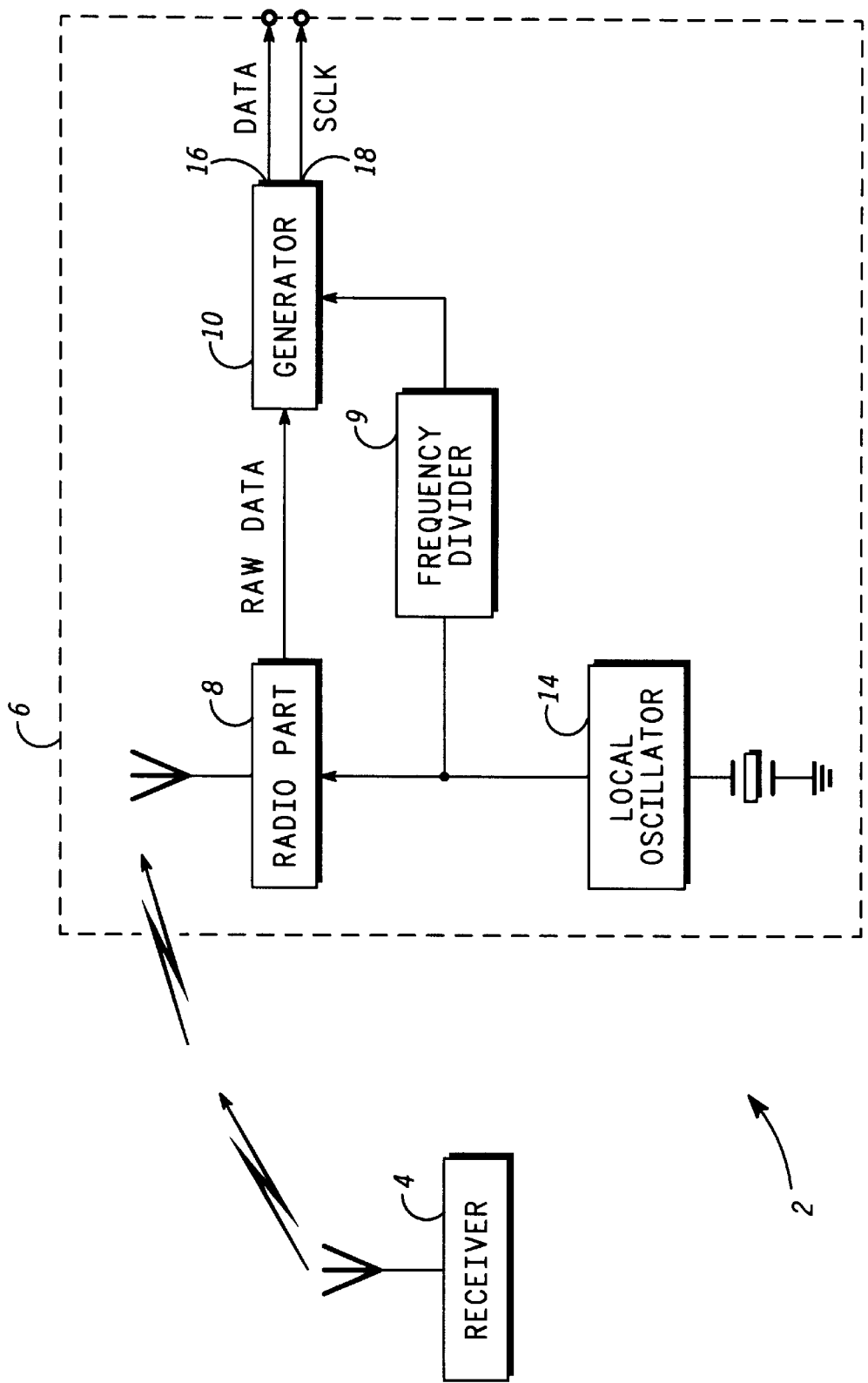
FIG. 1 is a block schematic diagram of a data communications system incorporating the present invention.

FIG. 1 shows a preferred implementation of the present invention in a radio data system 2. However, this is only one example of a system to which the invention may be applied. The present invention can be used in any data communications systems where a single communications channel is available, for example systems using single wire busses or a remote controlled access system for motor vehicles using radio frequency or infra-red transmission signals.

Referring firstly to FIG. 1, in a data communications system 2 in accordance with a preferred embodiment of the present invention, data is transmitted from a data transmitter 4 and received by a data receiver 6. The radio frequency of the data transmitter 4 is $f_{rf}$ and the data is sent at a predetermined data frequency ($f_{tx}$). The present invention is concerned with generating a clock signal in the data receiver 6, which clock signal is substantially synchronised to the received data and therefore very few details of the data transmitter 4 will be given herein. It will however be appreciated that any data transmitter may form the data transmitter 4 of the data communications system 2.

The data receiver 6 in accordance with the present invention comprises a radio part 8 and a clock signal generator 10. The radio part 8 receives data transmitted by the data transmitter 4 via an antenna 12 and a signal having a frequency $f_{lo}$ generated by a local oscillator 14 and provides raw data at an output. The output of the radio part 8 is coupled to the clock signal generator 10.

The invention requires the generation in the data receiver 6 of a clock signal whose frequency $f_{clk}$ is approximately the same as the predetermined data frequency fx. In the preferred embodiment, the data receiver 6 comprises a superheterodyne radio receiver in which the received RF signal at $f_{rf}$ is mixed with the signal from the local oscillator 14 at $f_{lo}$ to provide an Intermediate Frequency signal IF at frequency $f_{if}$, where $f_{if}=f_{lo}-f_{rf}$. A baseband data signal at $f_{tx}$ is generated by standard demodulation means at the output of the IF section (not shown) of the superheterodyne receiver. The frequency $f_{lo}$ may be expressed as $(1+p)*f_{rf}$, where p usually has a low value less than 1, for example p=0.001. Thus, $f_{if}=p*f_{rf}$. Since in the data transmitter 4, the frequencies $f_{rf}$ and $f_{tx}$ are known, the relationship between them is also known. For convenience, $f_{tx}$ may be chosen to be an exact submultiple of $f_{rf}$. Therefore, in the data receiver 6 it is trivial, for example by means of frequency divider 9 connected to the local oscillator 14, to generate a clock signal $f_{clk}$ whose frequency is $(1+p)*f_{tx}$.

Although imprecision in the circuits used to generate all transmitter and receiver signals means that the difference in the frequencies of $f_{clk}$ and $f_{tx}$ cannot be known exactly, the sign of the difference may always be known by choosing a suitable value for p, where p can be a positive or negative number. However, in the preferred embodiment, the component tolerances are chosen such that p is always positive.

The clock signal $f_{clk}$ provided by the frequency divider 9 is coupled to the clock signal generator 10. The clock signal generator 10 has two outputs 16 and 18 for providing the received data and a clock signal SCLK, respectively, which signals are coupled to other circuits (not shown) of the data receiver for decoding of the data. The clock signal SCLK at the clock output 18 is substantially synchronised to the received data.

Figure 2:
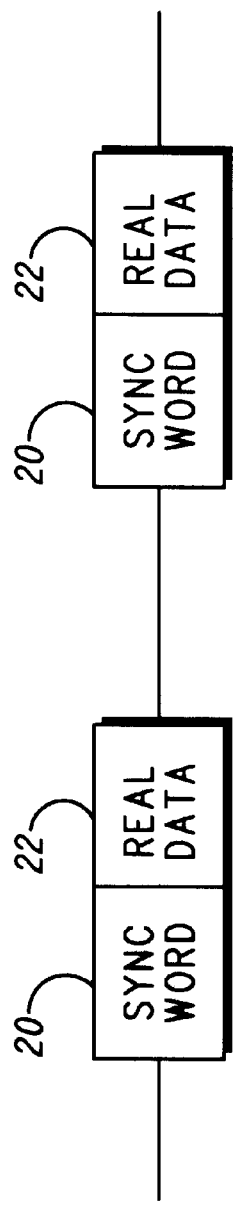
FIG. 2 is a representation of the data transmitted by the data transmitter of the data communications system of FIG. 1.

In the preferred embodiment, the data transmitter 4 transmits data comprising at least a sync word 20 and real data 22 (see FIG. 2). The sync word 20 preferably comprises 8 data bits having a predetermined value and the real data may comprise 100 bits. Preferably, the data is Manchester coded. However, the data may be coded according to any coding scheme which continuously sends '1's and '0's. An advantage of using the Manchester coding scheme is that the average value of one bit of data is half way between a logic '1' and a logic '0'. This average value can then be used by the data receiver to determine whether the data is '1' or '0' by determining when the data is above the average value or below the average value, respectively.

Figure 4:
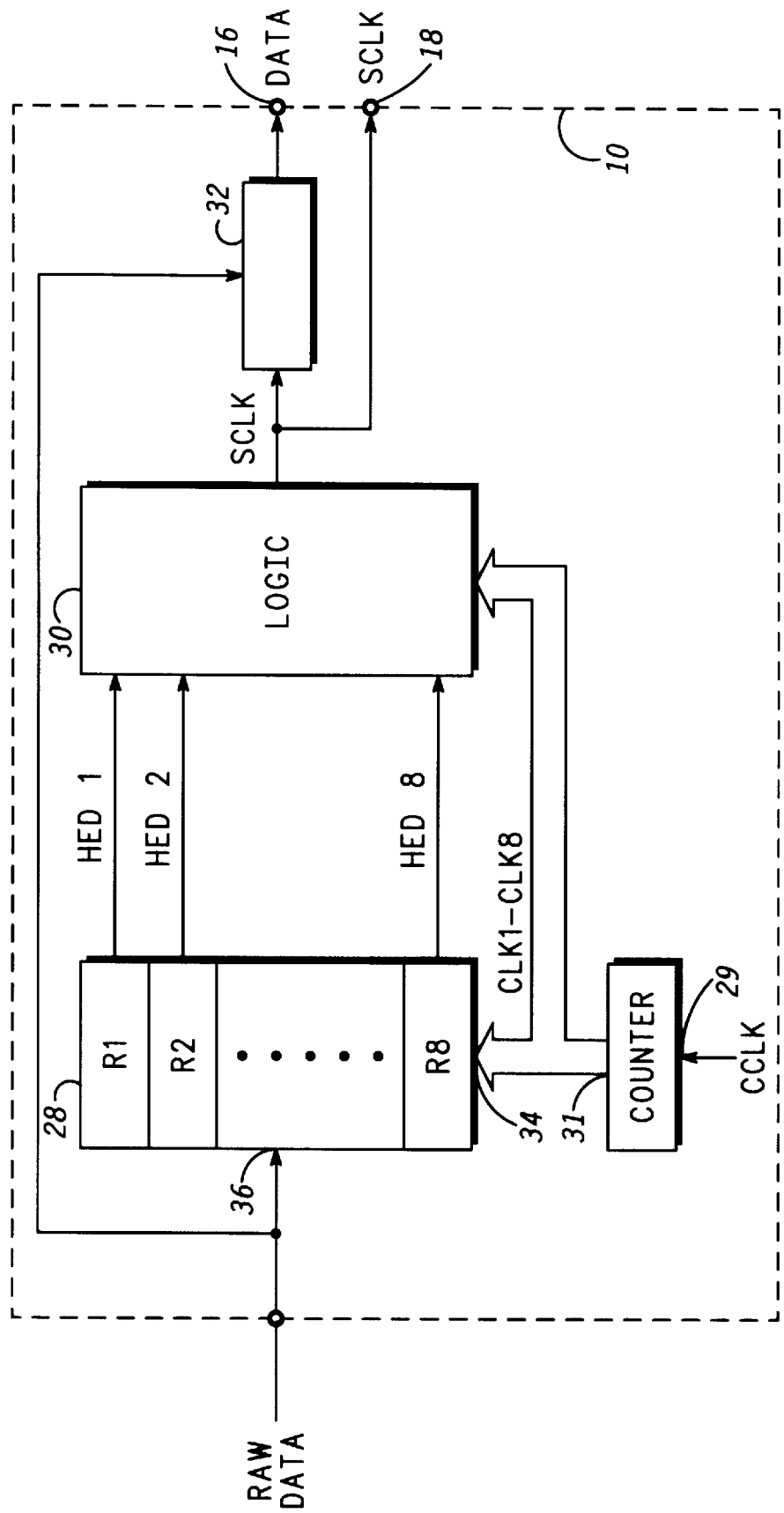
FIG. 4 is a block schematic diagram of a clock generator in accordance with the present invention which is part of the data receiver shown in FIG. 1.
Figure 5:
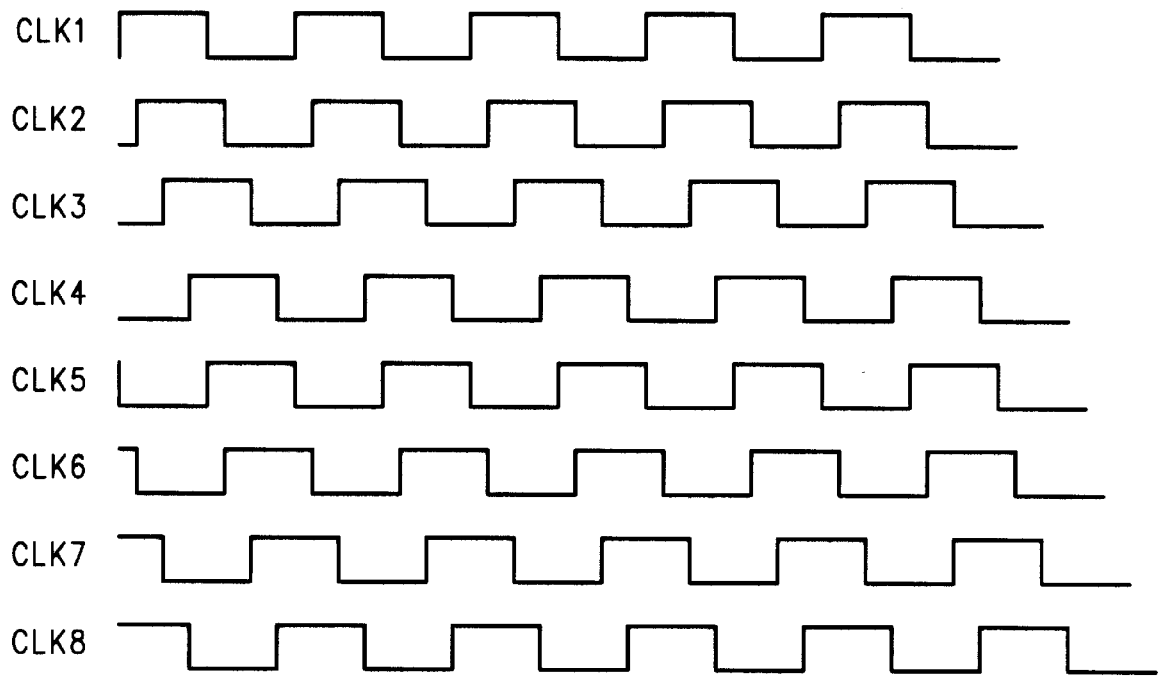
FIG. 5 is a representation of the n clocks which are generated in the clock generator of FIG. 4.

Referring now to FIG. 4, a clock signal generator 10 for generating a clock signal substantially synchronised with received data is shown in more detail. The clock signal generator 10 comprises means for generating n clocks, each of the n clocks having a frequency $f_{clk}$ which is substantially the predetermined data frequency $f_{rx}$ and being out of phase with an adjacent clock of the n clocks by 1/n of a clock a clock period. Preferably, the n clock generating means comprises a counter 26 clocked by a counter clock CCLK provided at an input 29 so as to provide n clocks at an output 31. The counter clock CCLK has a frequency which is equal to $n*(1+p)*f_{rx}$, which is derived from the signal generated by the local oscillator 14. The counter counts up to n so that each of the n clocks has a frequency $f_{clk}$ which is substantially the predetermined data frequency ($f_{clk}=(1+p)*f_{rx}$) and is out of phase with an adjacent clocks by 1/n of a clock period (see FIG. 5).

The n clocks are coupled to a clock input 34 of register means 28 which has a data input 36 for receiving the raw data from the radio part 8 and which register means 28 comprises n registers. Each of the n registers is clocked by a respective one of the n clocks. The raw data, that is the sync word 20 followed by the real data 22, is shifted in parallel into each of the n registers according to its respective clock.

In the preferred embodiment, n is equal to eight (8) such that counter 26 provides eight (8) clocks CLK1–CLK8 at the output 31 (see FIG. 5) to eight (8) registers R1–R8. However, n can be any integer greater than or equal to 4. Thus, the sync word 20 of the raw data is clocked into the first register R1 by the first clock (CLK1), is clocked into the second register R2 by the second clock (CLK2) and so on with the sync word 20 of the raw data being clocked into the eighth register R8 by the eighth clock (CLK8).

Figure 3:
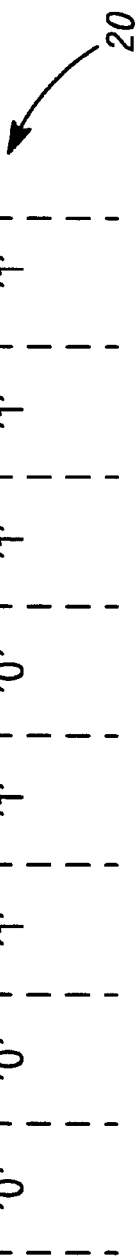
FIG. 3 is a representation of a Manchester coded word which in a preferred embodiment forms part of the data shown in FIG. 2.
Figure 6:
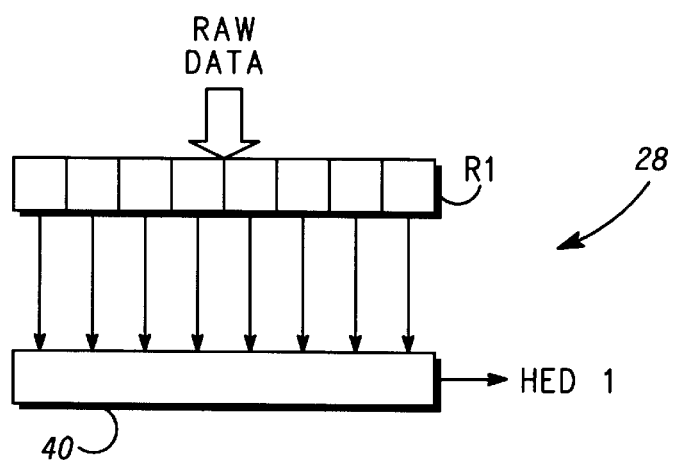
FIG. 6 is a block schematic diagram of part of the register means in accordance with a first embodiment of the invention which register means is part of the clock generator of FIG. 4.

Referring now also to FIG. 6, each register R1–R8 in accordance with a first embodiment of the present invention, only one R1 of which is shown in FIG. 6, has decode logic 40 coupled thereto for comparing the contents of R1 with a comparison word and for providing an output signal HED1 in response to the comparison to logic means 30. That is, each bit of data held in the register R1 is compared in parallel with corresponding bits of the comparison word. Eight output signals HED1–HED8 are therefore provided to logic means 30. The comparison word has a predetermined value that corresponds to the predetermined value of the sync word transmitted by data transmitter 4 and received by data receiver 6. In the preferred embodiment, the sync word and hence the comparison word has a predetermined value of '00110111'. FIG. 3 shows a sync word 20 comprising 8 bits of Manchester coded data representing the value 00110111.

If the contents of a register match the comparison word, then the output signal HED1–8 has a first logic state (e.g. logic '1') and if there is no match, then the output signal HED1–8 has a second logic state (e.g. logic '0'). Since in the preferred embodiment, the sync word of the received data is an eight bit word, each of the registers R1–R8 comprises an eight bit shift register.

In an ideal system without noise, four of the output signals HED1–8 would therefore be '1' and any of the four associated clocks CLK1–CLK8 would be valid and could be used to clock the data receiver decode circuits (not shown). The other four output signals HED1–8 would be '0'. However, as discussed above, noise can be a significant problem and can corrupt data. The logic means 30 therefore selects one of the registers R1–R8 which has an output signal HED1–HED8 having a logic '1' and whose clock is substantially immune to noise.

Figure 7:
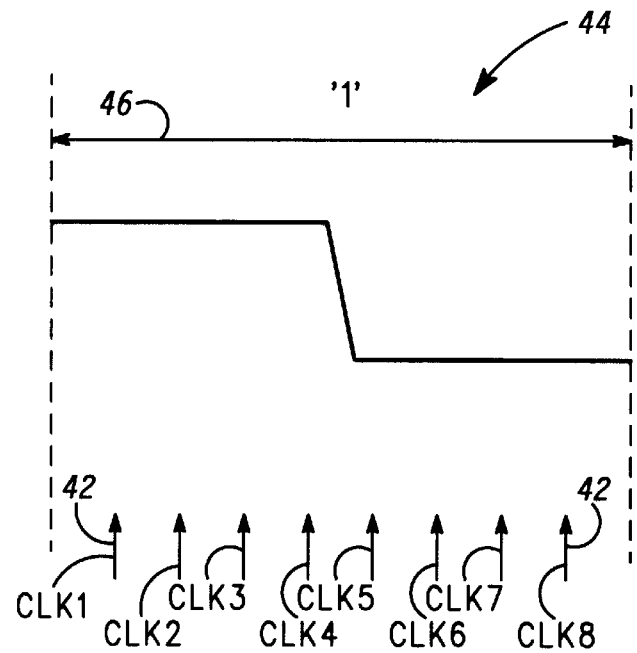
FIG. 7 is a representation of one Manchester coded data bit as sampled by the n clocks of FIG. 5.

Referring now also to FIG. 7 which shows a bit 44 of Manchester coded data with one clock period or bit period being represented by the reference numeral 46. The data bit 44 represents a Manchester coded logic '1'. The arrows 42 indicate as an example when each of the eight clocks CLK1–CLK8 sample the bit 44 as it is shifted into the respective registers R1–R8. The edges of bit 44 are liable to rounding in the filter (not shown) of the superheterodyne receiver (not shown) of the radio part 8 and parts of bit 44 after each level transition are susceptible to noise. It is therefore preferable to select as the data clock the latest of the n clocks CLK1 to CLK 8 which has correctly decoded the data: CLK4 in this example. However, the latest clock may in general be sufficiently near to the trailing edge of the data to be susceptible to phase noise, and so the preceding clock CLK3 is selected as the data clock. Since the frequency $f_{clk}$ has been chosen such that any difference between it and $f_{rx}$ is such that $f_{clk}$ is higher than $f_{rx}$ (p is a positive number), the selected data clock will remain correctly synchronised with the incoming received data for a maximum time before re-synchronisation is needed.

Logic means 30 selects the 'best' clock of the clocks CLK1–CLK8 by selecting the second last valid clock, in the example described above CLK3, or the only valid clock.

Figure 8:
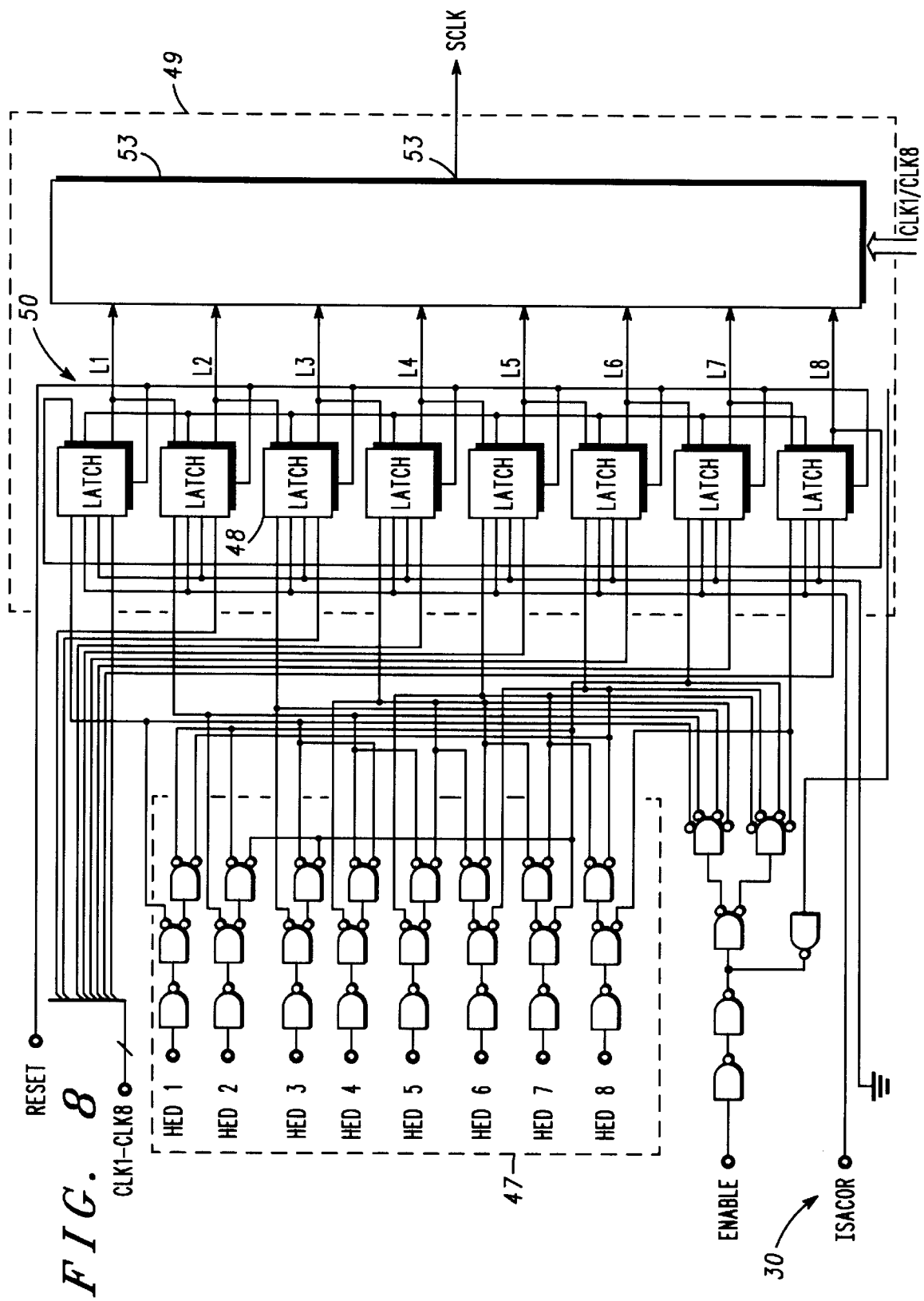
FIG. 8 is a schematic diagram of the logic means in accordance with the invention which is part of the clock generator of FIG. 4.

FIG. 8 shows a preferred embodiment of logic means 30. Logic means 30 comprises means 47 for determining which clocks of the n clocks are valid according to the following rule: If an output signal HEDm (where m represents the number of the output signal of a register) is a logic '1' and output signals HEDm+2 and HEDm+3 are both a logic '0', then the clock associated with HEDm is valid. Logic means 30 further comprises means 49 for determining which of the determined valid clocks is the second last valid clock or the only valid clock and for providing at an output 53 thereof the determined second last valid clock or the only valid clock as the selected one SLCK of the n clocks.

In the preferred embodiment the means 49 comprises a plurality of latches 50 and clock select means 52. Each of the plurality of latches 50 is clocked by a respective one of the n clocks CLK1–CLK8 and provides a respective latch output signal L1–L8. When the means 47 determines that a clock is valid, the latch clocked by the valid clock is enabled and a latch signal is provided at the output of the enabled latch having the first logic state '1'. The other latches also provide latch signals at their respective outputs having the second logic state '0'. For example, when the third clock CLK3 is selected, one 48 of the latches 50 associated with the third clock CLK3 is enabled and a latch signal L3 is provided at the output of the enabled latch 48 having the first logic state '1'. The other latches 50 also provide latch signals L1, L2, L4–L8 at their respective outputs having the second logic state '0'.

The latch signals L1–L8 corresponding to the eight clocks CLK1–CLK8 are supplied to the clock select means 52 along with the eight clocks CLK1–CLK8. The clock select means selects the clock whose latch signal has the first logic state, that is the third clock CLK3 which is provided at its output 53 as the selected clock SCLK.

Figure 9:
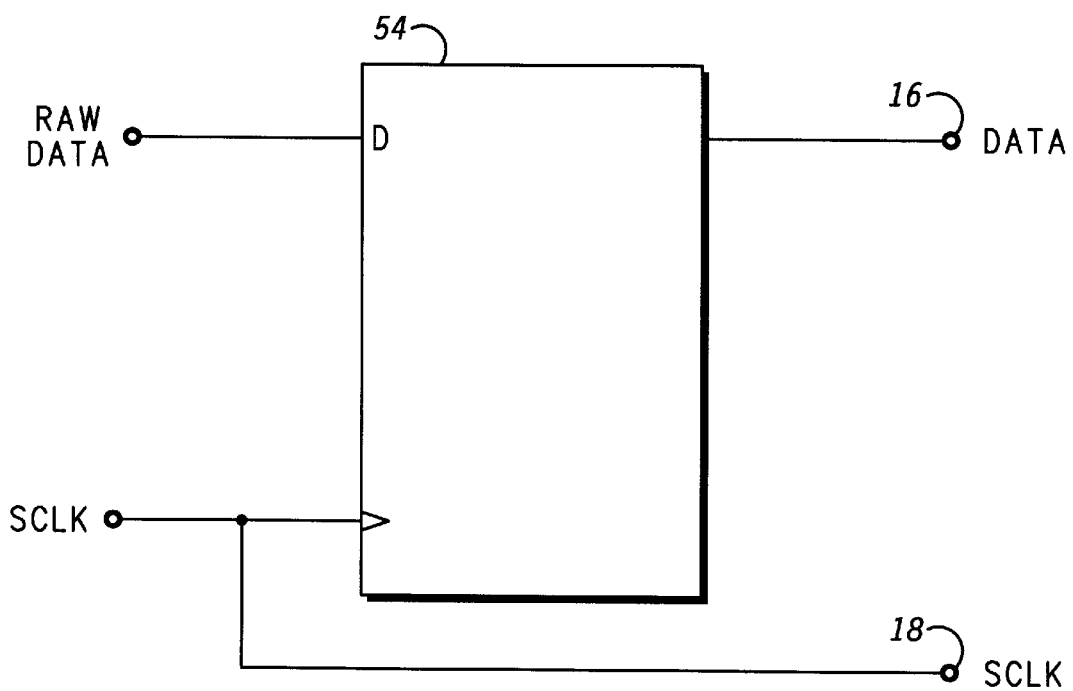
FIG. 9 is a schematic diagram of the data recovery circuit in accordance with the invention which is part of the clock generator of FIG. 4.

With reference also to FIG. 9, the selected clock SCLK is coupled to a data recovery circuit 32 and to the clock output 18 of the clock signal generator 10. The data recovery circuit receives the raw data from the radio part 8 and provides to the output 16 of the clock signal generator 10 the received data which is substantially synchronised to the selected clock SLCK.

The data recovery circuitry 32 preferably comprises a latch 54. The output 53 of the clock select means 52 is coupled to the clock input of the latch 54 and to the clock output 18 of the clock generator 10. The raw data from the radio part 8 is coupled to a data input of the latch 54. A data output of the latch 54 is coupled to the output 16 of the clock signal generator. The raw data at the data input of latch 54 is latched according to the selected clock such that the received data at the output 16 and the clock signal at the clock output 18 are substantially synchronised.

The clock signal generator 10 thus uses the sync word 20 of the received data to provide a clock which is substantially synchronised to the received data and which is used by the data receiver to decode the real data 22 following the sync word 20.

In a second embodiment of the invention, which embodiment utilises Manchester coded data, the symmetrical arrangement of the Manchester coded data is used to ensure that data and not noise has caused the recognition of the sync word.

A Manchester coded data bit (see for example FIG. 7) comprises a half bit having a logic '1' in one phase of the clock period and a half bit having a logic '0' in an anti-phase of the clock period. For the eight clocks CLK1–CLK8, the first clock CLK1 is de-phased by 180 degrees (or in other words is in antiphase) with the fifth clock CLK5, the second clock CLK2 is in anti-phase with the sixth clock CLK6, the third clock CLK3 is in anti-phase with the seventh clock CLK7 and the fourth clock CLK4 is in anti-phase with the eighth clock CLK8. Thus, when noise-free data is received, the contents of a register clocked by one clock will be inverted, that is different in every bit, compared to the contents of the register clocked by the anti-phase clock, the anti-phase register.

Figure 10:
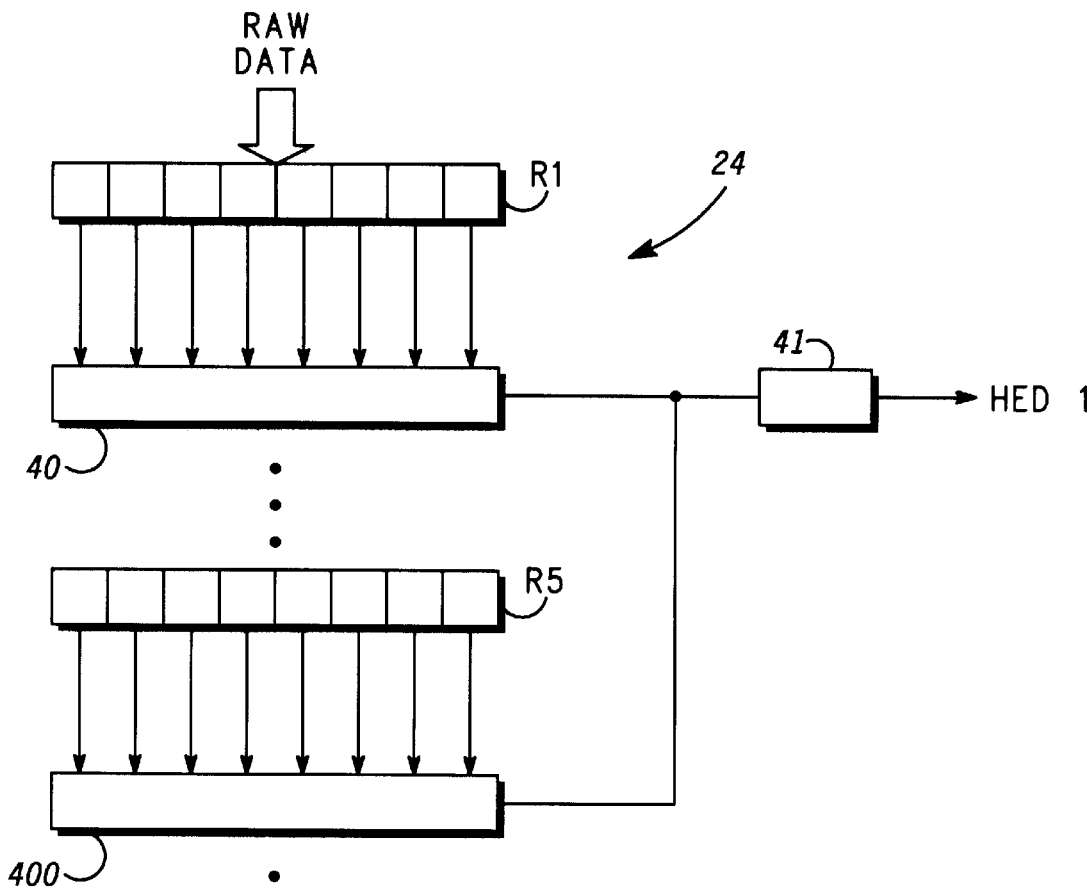
FIG. 10 is a block schematic diagram of part of the register means in accordance with a second embodiment of the invention.

With reference now to FIG. 10, which shows the register means 24 in accordance with the second embodiment of the invention, the register means 24 further comprises for each register R1–R8, only two registers R1 and R5 of which are shown, a logic gate 41, coupled to the decode logic 40 of the register R1 and to the decode logic 400 of the anti-phase register R5. Like components to those of FIG. 6 are referred to by the same reference numeral. The outputs of the logic gates 41 provide the output signals HED1–HED8. The output signal HED1 at the logic gate 41 has a first logic state (logic '1') only if the contents of the register R1 are decoded by decode logic 40 as being the predetermined sync word, 00110111 in the preferred embodiment, and the contents of the anti-phase register R5 are decoded by decode logic 400 as being the complement of the predetermined sync word, 11001000 in the preferred embodiment. The logic means 30 uses the output signals HED1–HED8 to select the appropriate clock as explained above for the first embodiment.

An advantage of the second embodiment is that the additional check with the anti-phase registers means that 16 bits are checked with 8 registers before a clock is accepted. This makes such an arrangement very immune to noise but using a minium number of registers.

If the real data 22 transmitted by the data transmitter 4 is long, for example more than 100 bits, the drift in frequency between the predetermined data frequency $f_{tx}$ and the frequency of the clocks CLK1–CLK8, due to for example crystal drift, may be significantly large so that the selected clock becomes unsynchronised with the received data. The data receiver 6 needs to be re-synchronised.

Thus, for long real data, the data receiver 6 in accordance with the present invention is re-synchronised by sending a plurality of data packets, each data packet comprising a sync word having the predetermined data frequency and the predetermined value, followed by real data and then followed by a plurality of non-Manchester coded zeros '0's or ones '1's. In the preferred embodiment eight zeros are transmitted in a data packet so that all the n registers R1–R8 of the register means 28 are filled with zeros. Such a sequence of 8 non-Manchester coded zeros can never occur in Manchester coded data. Thus, using this sequence to start re-synchronisation places no restriction on the contents of the Manchester coded data packet.

This resets the logic means 30 so that the latch of the selected clock is disabled, the latch output signal is reset and the selected clock is reset. The synchronisation process is then started again on receipt of a subsequent sync word 20.

This implementation allows the sending of an arbitrary number of sync words. As soon as one is recognised, the system latches the selected clock and keeps using it until the zeros do a reset.

Figure 11:
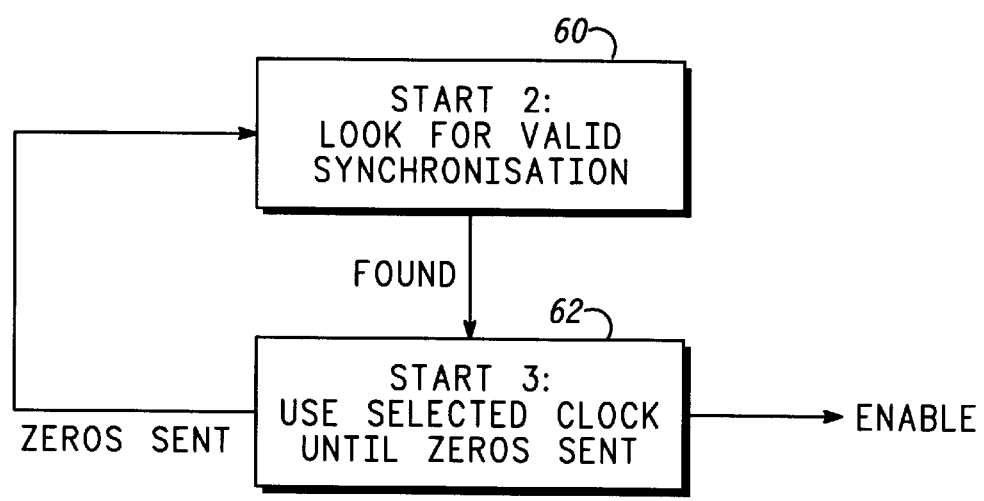
FIG. 11 is a state diagram.

FIG. 11 is a partial state diagram for the re-synchronisation process. At state 2, box 60, a valid sync word is looked for and when it is found state 3, box 62, is entered. In state 3, the selected clock is used to enable the microprocessor (not shown) of the data receiver 6 until a plurality of zeros are sent in order to re-synchronise the clock to the received data. The state machine returns to state 2, box 60. Preferably, the state machine is clocked by the selected clock when passing from state 2 to state 3, since the ENABLE signal, which may be used to allow an output to the data receiver microprocessor (not shown) when one of the clocks CLK1–CLK8 is selected, will always have the same phase relationship with the selected clock. Any clock may be used but if the selected clock is not used, some data may be lost.

The preferred embodiments have so far been described wherein the sync word comprises 8 bits. This is for illustrative purposes only. However, the clock signal generator in accordance with the present invention uses the sync word to provide a clock signal substantially synchronised to the received data in 1 bits, where 1 is the number of bits in the sync word. This is significantly shorter time period than the prior art arrangement which utilises a PLL. Thus, the present invention provides distinct advantages for use in battery powered applications, such as keyless entry systems for cars.

A further advantage of the present invention is that it does not sample the edges of the data as in the prior art arrangement described above and thus does not suffer from the noise problems associated with such an arrangement. The present invention is very immune to noise since it samples the data bit at ¾ bit period.

Furthermore, the noise immunity of the clock signal generator in accordance with the invention can be improved by looking at the contents of the anti-phase register. This can be achieved using simple logic.

It will be appreciated that the embodiments described herein may be implemented with the various signals having different combinations of logic states to those described herein.

The data receiver 6 in accordance with the invention may be used in a remote controlled access system (not shown) for vehicles. In such a system the data receiver 6 is installed in the vehicle (not shown) and the system further comprises a data transmitter, such as a remote unit or an electronic key which is carried by the vehicle operator. The data transmitter transmits a coded signal for locking or unlocking the doors of the vehicle which coded signal is received by the data receiver 6. The clock signal generator 10 of the data receiver 6 generates a clock signal synchronised to the coded signal as described above, which clock signal is used to decode the coded signal. If the coded signal is determined to be valid on decoding, the doors of the vehicle are then locked or unlocked. The coded signal for locking or unlocking the doors of the vehicle may be a radio frequency signal or an infra-red signal or other similar signal.

We claim:

1. A method for generating a clock signal for use in a data receiver, the clock signal being substantially synchronised with data received by the data receiver, the received data comprising a sync word having a predetermined data frequency and predetermined value and being Manchester coded so that each bit of the sync word comprises a logic '1' in one phase of a clock period and a logic '0' in an anti-phase of the clock period, the method comprising the steps of:

generating n clocks, each of the n clocks having a frequency which is substantially the predetermined data frequency and being out of phase with an adjacent clock of the n clocks by 1/n of the clock period, each of the n clocks further having one other clock of the n clocks in anti-phase therewith, wherein the data receiver comprises register means comprising n registers, each of the n registers being clocked by a respective one of the n clocks, and having an anti-phase register clocked by an anti-phase clock;

shifting the received data into each register of the n registers in parallel according to the respective clock of the n clocks;

comparing the contents of each register with a Manchester coded comparison word having the predetermined value and providing a comparison signal for each of the n registers, the comparison signal having a first logic state when the contents of the register match the comparison word and a second logic state when the contents of the register do not match the comparison word;

checking whether the contents of each register is inverted compared to the contents of its anti-phase register;

providing an output signal for each register, the output signal having a first logic state when the comparison signal for the register has a first logic state and the contents of the register is inverted compared to the contents of its anti-phase register, and a second logic state when the comparison signal of the register has a second logic state and/or the contents of the register is not inverted compared to the contents of its anti-phase register;

selecting one of the n clocks which clocks a register whose output signal has the first logic state; and providing the selected one of the n clocks at an output, the selected one of the n clocks providing the clock signal.

2. A method according to claim 1 wherein the received data comprises a plurality of data packets, each comprising a sync word having the predetermined data frequency and the predetermined value, followed by real data, followed by a plurality of zeros or a plurality of ones, the method further comprising the steps of:

resetting the determined clock on receipt of the plurality of zeros or the plurality of ones; and generating a clock signal which is substantially synchronised to the received data using the next sync word.

3. A method according to claim 1 wherein the selecting step comprises the steps of:

determining which clocks of the n clocks are valid according to the following rule:

if an output signal m has the first logic state, and second (m+2) and third (m+3) output signals in succession from the output signal both have the second logic state, then the clock associated with the output signal m is valid;

determining which of the determined valid clocks is the second last valid clock or the only valid clock; and providing the second last valid clock or the only valid clock as the selected one of the n clocks.

4. A method according to claim 1 wherein n is at least four.

5. A method according to claim 1 wherein the frequency of each of the n clocks is equal to $(1+p)*f_{rx}$, where $f_{rx}$ is the predetermined data frequency and p is a positive or negative number less than 1.

6. A clock generator for generating a clock signal for use in a data receiver, the clock signal being substantially synchronised with data received by the data receiver, the received data comprising a sync word having a predetermined data frequency and a predetermined value, and being Manchester coded so that each bit of the sync word comprises a logic '1' in one phase of a clock period and a logic '0' in an anti-phase of the clock period, the clock generator comprising:

means for generating n clocks, each of the n clocks having a frequency which is substantially the predetermined data frequency and being out of phase with an adjacent clock of the n clocks by 1/n of the clock period, each of the n clocks further having one other clock of the n clocks in anti-phase therewith;

register means coupled to receive the received data, the register means comprising:

n registers, each of the n registers being clocked by a respective one of the n clocks such that the received data is shifted into each register of the n registers in parallel according to the respective clock of the n clocks, each of the n registers having an anti-phase register clocked by an anti-phase clock, n decode logic coupled to respective registers of the n registers, each decode logic for comparing the contents of the respective register with a Manchester coded comparison word having the predetermined value and providing a comparison signal at an output, the comparison signal having a first logic state when the contents of the respective register match the comparison word and a second logic state when the contents of the respective register do not match the comparison word, and n logic gates for respective registers of the n registers, each logic gate being coupled to the decode logic of the respective register and to the decode logic of its anti-phase register for checking whether the contents of the respective register is inverted compared to the contents of its anti-phase register and for providing an output signal for the respective register, the output signal having a first logic state when the comparison signal for the register has a first logic state and the contents of the register is inverted compared to the contents of its anti-phase register, and a second logic state when the comparison signal of the register has a second logic state and/or the contents of the register is not inverted compared to the contents of its anti-phase register; and logic means for selecting one of the n clocks which clocks a register whose output signal has the first logic state and for providing the selected one of the n clocks as the clock signal for use in the data receiver.

7. A clock generator according to claim 6 wherein the logic means comprises:

means for determining which clocks of the n clocks are valid according to the following rule:
if an output signal m has the first logic state, and second (m+2) and third (m+3) output signals in succession from the output signal both have the second logic state, then the clock associated with the output signal m is valid; and means for determining which of the determined valid clocks is the second last valid clock or the only valid clock and providing the second last valid clock or the only valid clock as the selected one of the n clocks.

8. A clock generator according to claim 6 wherein n is at least four.

9. A clock generator according to claim 6 wherein the frequency of each of the n clocks is equal to $(1+p)*f_{rx}$, where $f_{rx}$ is the predetermined data frequency and p is a positive or negative number less than 1.

10. A clock generator according to claim 6 further comprising a data recovery circuit having a data input for receiving the received data, a clock input for receiving the selected clock from the logic means, the data recovery circuit using the selected clock to provide the received data at an output, for use in the data receiver, which is substantially synchronised to the selected clock.

11. A data receiver for receiving data transmitted by a data transmitter, the data receiver comprising a clock generator for generating a clock signal for use in a data receiver, the clock signal being substantially synchronised with data received by the data receiver, the received data comprising a sync word having a predetermined data frequency and a predetermined value, and being Manchester coded so that each bit of the sync word comprises a logic '1' in one phase of a clock period and a logic '0' in an anti-phase of the clock period, the clock generator comprising:

means for generating n clocks, each of the n clocks having a frequency which is substantially the predetermined data frequency and being out of phase with an adjacent clock of the n clocks by 1/n of the clock period, each of the n clocks further having one other clock of the n clocks in anti-phase therewith;

register means coupled to receive the received data, the register means comprising:

n registers, each of the n registers being clocked by a respective one of the n clocks such that the received data is shifted into each register of the n registers in parallel according to the respective clock of the n clocks, each of the n registers having an anti-phase register clocked by an anti-phase clock, n decode logic coupled to respective registers of the n registers, each decode logic for comparing the contents of the respective register with a Manchester coded comparison word having the predetermined value and providing a comparison signal at an output, the comparison signal having a first logic state when the contents of the respective register match the comparison word and a second logic state when the contents of the respective register do not match the comparison word, and n logic gates for respective registers of the n registers, each logic gate being coupled to the decode logic of the respective register and to the decode logic of its anti-phase register for checking whether the contents of the respective register is inverted compared to the contents of its anti-phase register and for providing an output signal for the respective register, the output signal having a first logic state when the comparison signal for the register has a first logic state and the contents of the register is inverted compared to the contents of its anti-phase register, and a second logic state when the comparison signal of the register has a second logic state and/or the contents of the register is not inverted compared to the contents of its anti-phase register; and logic means for selecting one of the n clocks which clocks a register whose output signal has the first logic state and for providing the selected one of the n clocks as the clock signal for use in the data receiver.

12. A data receiver according to claim 11 further comprising a state machine for determining the state of the data receiver, the state machine being clocked by the clock signal generated by the clock generator.

13. A remote controlled access system for vehicles comprising a data transmitter for transmitting a coded signal for locking or unlocking the doors of the vehicle, the system further comprising a data receiver for receiving data transmitted by a data transmitter, the data receiver comprising a clock generator for generating a clock signal for use in a data receiver, the clock signal being substantially synchronised with data received by the data receiver, the received data comprising a sync word having a predetermined data frequency and a predetermined value, and being Manchester coded so that each bit of the sync word comprises a logic '1' in one phase of a clock period and a logic '0' in an anti-phase of the clock period, the clock generator comprising:

means for generating n clocks, each of the n clocks having a frequency which is substantially the predetermined data frequency and being out of phase with an adjacent clock of the n clocks by 1/n of the clock period, each of the n clocks further having one other clock of the n clocks in anti-phase therewith;

register means coupled to receive the received data, the register means comprising:

n registers, each of the n registers being clocked by a respective one of the n clocks such that the received data is shifted into each register of the n registers in parallel according to the respective clock of the n clocks, each of the n registers having an anti-phase register clocked by an anti-phase clock, n decode logic coupled to respective registers of the n registers, each decode logic for comparing the contents of the respective register with a Manchester coded comparison word having the predetermined value and providing a comparison signal at an output, the comparison signal having a first logic state when the contents of the respective register match the comparison word and a second logic state when the contents respective register do not match the comparison word, and n logic gates for respective registers of the n registers, each logic gate being coupled to the decode logic of the respective register and to the decode logic of its anti-phase register for checking whether the contents of the respective register is inverted compared to the contents of its anti-phase register and for providing an output signal for the respective register, the output signal having a first logic state when the comparison signal for the register has a first logic state and the contents of the register is inverted compared to the contents of its anti-phase register, and a second logic state when the comparison signal of the register has a second logic state and/or the contents of the register is not inverted compared to the contents of its anti-phase register; and logic means for selecting one of the n clocks which clocks a register whose output signal has the first logic state and for providing the selected one of the n clocks as the clock signal for use in the data receiver.

14. A remote controlled access system according to claim 13 wherein the coded signal for locking or unlocking the doors of the vehicle is a radio frequency signal.

15. A remote controlled access system according to claim 13 wherein the coded signal for locking or unlocking the doors of the vehicle is an infra-red signal.

* * * * *